Figures 3, 4:
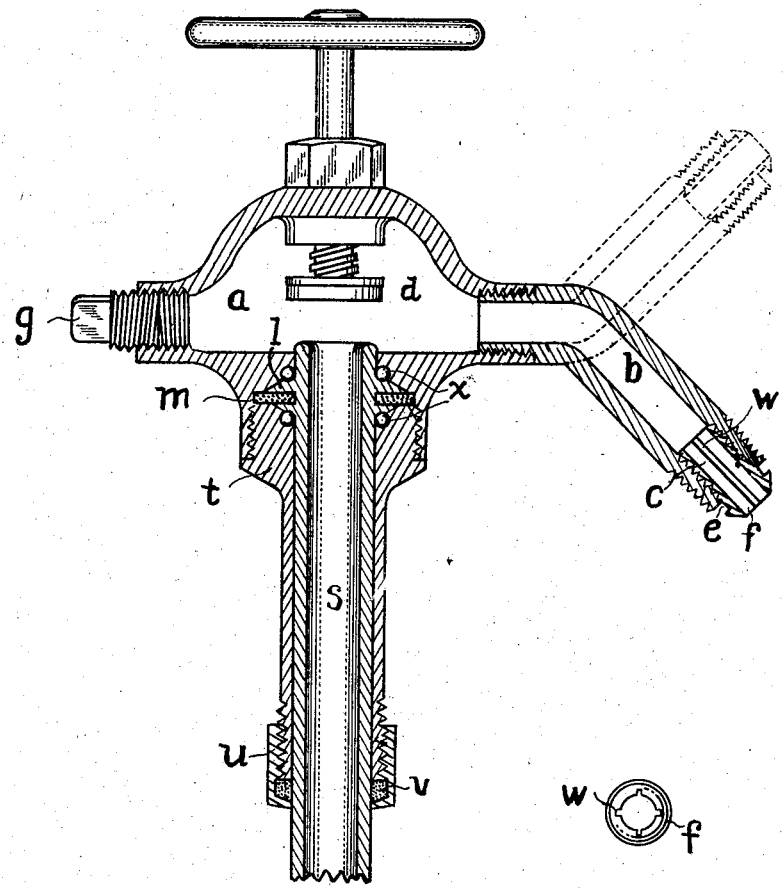

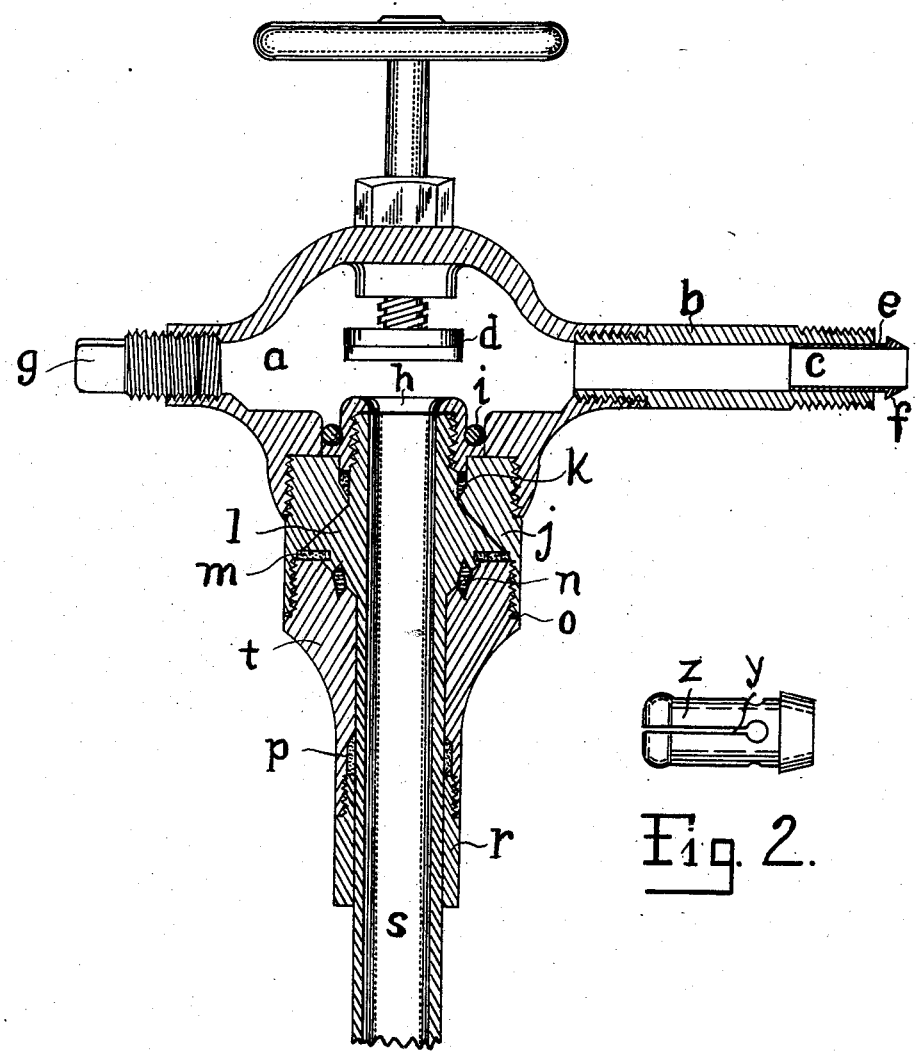

Patented July 14, 1931

1,814,411

UNITED STATES PATENT OFFICE

OLIN F. RUSSELL, OF LOS ANGELES, CALIFORNIA

VALVE

Application filed July 12, 1926. Serial No. 121,878.

The invention relates to improvements in valves, and more particularly to that class of valves adapted to be used in connection with garden hoses and sprinklers; and the objects of the improvements are; first, to provide a swivel-valve in which the upper part of the valve body, or that part to which the hose is attached will readily turn in the direction of the hose on a stationary member; second, to afford means by which the turning member is held in proper alignment with the stationary member; third, to provide antifriction means between the turning and the stationary sections; and fourth, to provide a simple and novel means for holding the revolving section from sliding down or being moved upward on the stationary member.

Other objects and advantages will appear later in the specification and pointed out more particularly in the claims.

In the drawings Figure 1 is a vertical longitudinal sectional view disclosing the several parts. Fig. 2 is a side elevation showing one construction of the washer holder. Fig. 3 is a vertical sectional view of a modification showing the alignment members in a more simple form, and Fig. 4 is an end elevation of the washer retainer for the spigot.

Like letters refer to similar parts throughout the several views, in which the revolving section of the valve is composed of the upper part (a) to which is secured the outlet member or spigot (b), the valve (d) and the plug (g), also the members (j), (o), (p), (t) and (r), while the stationary section is composed of the hollow stem (s), carrying at its upper end a removable valve seat (h) and the alignment members (l) and (n), the washer (i) and the gasket (m).

To the end of the spigot (b) is secured a washer holder (c) provided with a tapering end (f) adapted to enter the end of the hose connection and formed with a groove (e) in the form shown in Fig. 3 to receive and retain the washer (not shown).

The stem (s) is to be connected in any preferred manner to a main supply pipe, and it is provided with a concentric radially extending member (l) which holds the revolving section of the valve in proper alignment and prevents it from sliding down on the stem or from being moved upward.

The stem (s) is also provided at its upper end with a removable valve seat (h) Fig. 1. The valve seat has a groove in which is carried a gasket (i), which in the present instance is round but may be of any preferred shape to prevent leakage. The lower end of the removable valve seat also serves as a packing gland on the packing (k).

To facilitate changing the valve seat or packing, the member (j) is provided, and it is not intended that members (j) and (t) exert any pressure on the member (l) or against gasket (m), and to this purpose a plurality of shims (o) are placed between the lower end of member (j) and a shoulder provided on member (t).

The ring (n) serves the three-fold purpose of a water seal or packing, an alignment device, and when made of bronze or other antifriction material a means for lessening the friction between the revolving and stationary sections of the valve.

In Fig. 3 at the lower end of sleeve (t) is shown the usual form of a packing nut (u) and packing (v) and in Fig. 1 is shown a packing (p) and an improved packing gland (r) which has no projecting sides.

It will be seen that this valve may be used as a revolving sprinkler when pipes with side holes are screwed into the valve in place of the spigot (b) and plug (g) in which case ball bearings (x) Fig. 3 will allow it to revolve freely.

The spigot (b) may extend outward and horizontal as shown in Fig. 1, outward and downward as shown in Fig. 3; or outward and upward as shown in dotted lines in Fig. 3; the latter being used in valve pots below the surface of the ground.

The washer retainer (c) may either be driven in as shown in Fig. 1, made with spring sides as shown in Fig. 2 and pressed in or screwed in as in Fig. 3. In the latter case grooves (w) Fig. 4 are provided to receive the blade of a screwdriver.

Two hoses may be used at one time by replacing plug (*g*) with another spigot.

It will now be seen that I have provided a swivel-valve that will turn freely and will not leak. It can easily be taken apart for repairs and reassembled.

What I claim is:

1. A valve comprising a stationary section and a revolving section; the revolving section including a hollow outer member having one or more outlets, a valve handle, valve stem and valve disk, an inner sleeve member provided with packing means, a threaded connection between the hollow outer member and the sleeve member and shims for adjustment between the revolving section and the sleeve member, the stationary section comprising a hollow stem having means adapted to engaged means provided in the revolving section for holding the latter in alinement and for preventing it from longitudinal movement relative to the revolving section.

2. A valve comprising a revolvable section and a stationary section; the revolvable section including a hollow upper member having a valve handle, valve stem, valve head and a spigot having threaded connections with said hollow upper member, a hollow intermediate member and a hollow lower member, a packing and gland at the lower end of said hollow lower member, the stationary section comprising a tubular member engaged by said packing and provided with an annular V shaped rib projecting from the outer wall and engaging beveled walls of the hollow intermediate and lower members.

3. A valve comprising a stationary tubular member having a valve seat at one end and a revolving section including a hollow outer member having a valve handle, valve stem, valve head, and a spigot, a sleeve provided with a beveled wall formed in the lower part of the hollow outer member, a sleeve member having threaded connection with said sleeve and provided with a beveled end, a packing nut and packing provided at the lower end of said sleeve member, an annular rib extending from the outer wall of the stationary tubular member and engaging the beveled portion of said sleeve member and sleeve, a gasket engaged by said annular rib and a removable gasket retainer secured to the spigot.

4. A valve comprising a stationary tubular member having a valve seat at one end and provided with an annular rib having ball-bearing races provided thereon, a revolvable section including a hollow outer member having a valve handle, valve stem and valve head, and an outlet spigot provided with removable gasket retaining means, a sleeve provided with a beveled wall and having a ball-bearing race formed in the lower part of the hollow outer member, a sleeve member having threaded connection with said sleeve and provided with a beveled end wall containing a ball-bearing race, a packing nut and packing provided at the lower end of the sleeve member for engaging said tubular member, a gasket and ball bearings between the annular rib and the beveled walls of the sleeve members.

5. A valve comprising a hollow stationary member provided with a circular rib rigid therewith, a movable hollow upper member having one or more spigots provided with hose connecting means, a valve handle, stem and valve disk, a removable hollow lower section secured to said hollow upper member and a groove in which said rib is retained formed by the said lower section and the movable hollow upper member.

6. A valve comprising a hollow stationary member provided with an alignment rib rigid therewith, and a valve seat provided on its inner end, a hollow outer member carrying a valve handle, stem and disk and provide with an outlet spigot, a sleeve member held in threaded engagement with the hollow outer member, an inwardly beveled upper end on said sleeve, and a beveled shoulder near the lower end of the hollow outer member, the said two beveled ends adjoining to form a V shaped groove adapted to receive the alignment rib provided on the stationary member, and packing means provided on the sleeve member.

OLIN F. RUSSELL.